United States Patent [19]
Brenna et al.

[11] Patent Number: 5,169,809
[45] Date of Patent: Dec. 8, 1992

[54] SIO2-AND ZRO2-BASED CERAMIC FIBERS AND PROCESS FOR THE PREPARATION THEREOF

[75] Inventors: Umberto Brenna, Cinisello Balsamo; Giovanni Carturan, Albignasego; Gianmarco Del Felice, Monza; Mirto Mozzon, Pasiano, all of Italy

[73] Assignee: SNIA Fibre s.p.a., Cesano Maderno, Italy

[21] Appl. No.: 470,167

[22] Filed: Jan. 25, 1990

[51] Int. Cl.[5] .................. C04B 35/48; C04B 33/12
[52] U.S. Cl. .......................... 501/95; 501/103; 501/106; 501/133; 423/326; 423/336; 423/338; 423/608
[58] Field of Search ............... 501/95, 102, 103, 106, 501/133; 35/2, 8; 423/338, 336, 329, 608

[56] References Cited
U.S. PATENT DOCUMENTS

| | | | |
|---|---|---|---|
| 3,709,706 | 5/1969 | Sowman | 501/103 |
| 3,793,041 | 2/1974 | Sowman | 501/103 |
| 4,732,878 | 3/1988 | Everitt | 501/95 |
| 4,797,378 | 1/1989 | Sowman | 501/95 |
| 4,810,441 | 3/1989 | Emblem et al. | 501/95 |
| 4,927,622 | 5/1990 | Jade | 423/608 |

OTHER PUBLICATIONS

Kamiya et al., *Journal of Materials Science*, 15:1765–1771 (1980).
Sakka and Kuzuka, *Journal of Non-Crystalline Solids*, 100:142–153 (1988).

Primary Examiner—William R. Dixon, Jr.
Assistant Examiner—Paul Marcantoni
Attorney, Agent, or Firm—Greenfield & Sacks Wolf

[57] ABSTRACT

The present invention relates to $ZrO_2$- and $SiO_2$-based ceramic fibers in which the weight ratio between $SiO_2$ and $ZrO_2$ is comprised between 99 and 0.7. The tetragonal $ZrO_2$ phase is stable at temperatures comprised between 0° and 1500°C. The process comprises the preparation of: a solution of $Zr(OR^1)_4$, where $R^1$ is an alkyl or aryl, $Si(OR^2)_4$, where $R^2$ is alkyl or aryl, an organic solvent and an acid. Vapor-phase water is bubbled in said solution, then the obtained solution is drawn and the fibers thus obtained are heated to obtain the crystallization of $ZrO_2$ and $SiO_2$.

29 Claims, 11 Drawing Sheets 455X    20KV  WD:20MM  S:01304 .P:00003
100UM ─────────────────────────────
        ZS APPESE 806X    20KV  WD:21MM  S:01304 P:00002
50UM ─────────────────────────────
        ZS AP 1.86KX  20KV WD:32MM  S:01905 P:00005
20UM 557X  20KV WD:20MM  S:01304 P:00006
50UM
ZS T.T.:1100C

SIO2-AND ZRO2-BASED CERAMIC FIBERS AND PROCESS FOR THE PREPARATION THEREOF

BACKGROUND OF THE INVENTION

1. Field of the Invention

The present invention relates to a $SiO_2$- and $ZrO_2$-based ceramic fibers. The invention furthermore relates to the process for preparing said ceramic fibers.

More in particular, the field of the present invention relates to a process for preparing $ZrO_2$- and $SiO_2$- based ceramic fibers which comprises the steps of:

a) preparing a solution formed by the compound of formula (I)

$$Zr(OR^1)_4 \quad (I)$$

where $R^1$ is an alkyl or aryl,
by the compound of formula (II)

$$Si(OR_2)_4 \quad (II)$$

where $R^2$ is an alkyl or aryl,
by an organic solvent and by an acid, preferably maintained at a temperature comprised between 0° and 100° C., and hydrolysis, with consequent polymerization of the compound of formula (I) and of the compound of formula (II), b) drawing of the solution obtained with said step (a), c) heating of the fibers obtained with said step (b) until the crystallization of $ZrO_2$ and $SiO_2$ is obtained.

The ceramic fibers obtained according to the invention have a vast range of utilization, since they are particularly resistant to high temperatures, especially when they contain a relatively high percentage of $ZrO_2$. In particular, said fibers have considerable mechanical properties at high temperatures, and this allows to use them as reinforcement structure, for example embedded in the casting of metallic materials, in particular of aluminum-based light alloys, or in composite materials, even basic ones, with a ceramic matrix.

By way of example, said fibers can also be used in the manufacture of catalytic elements.

The above is in summary the main fields of industrial utilization of the invention, but said fields do not constitute a limitation to the scope thereof, since the process according to the invention and the ceramic fibers obtained, in particular as described and claimed hereafter, can be advantageously used in any other equivalent field in which ceramic fibers adapted to withstand high temperatures are produced with a process which entails the steps (a), (b) and (c) described above.

PRIOR ART

Processes of this kind are known and described for example in the Journal of Materials Science 15 (1980), 1765-1771.

Such known processes, however, entail some problems: first of all they are extremely slow, particularly in the hydrolysis step, in which the solution is exposed to air so that it absorbs the air's moisture. Very long times, 1 to 12 days, are in fact required. The conditions of the hydrolysis which causes the polymerization of the compound of formula (I) and of the compound of formula (II) are furthermore scarcely repeatable and are in practice not suitable for industrial production.

When the concentrations of the compound of formula (I) are relatively high, the corresponding hydrated oxide tends to precipitate, thus becoming unavailable for the polymerization reaction. The addition of water is particularly critical, since it accelerates this tendency to precipitate.

Another process known in the field of the invention is described in the Journal of Non-Crystalline Solids 100 (1988), 142-153. Said process teaches that only solutions which maintain a Newtonian viscous behavior up to high viscosity can be drawn.

For the purposes of the present invention, the term "Newtonian viscous behavior" is used to indicate a behavior in which viscosity is substantially constant for different flow rates of the fluid. The term "non-Newtonian viscous behavior" indicates a behavior in which viscosity varies significantly as the fluid's flow rate increases during the viscosity measurement.

Known processes do not allow adequate control of a critical element of the drawing process: the increase in viscosity. During step (a), viscosity in fact rises progressively during the addition of water, starting from viscosity values which are too low for drawing, and on the contrary tends to reach excessive values. Excessively low viscosity produces a solution which cannot be drawn since the filaments tend to break during drawing, whereas excessively high viscosity causes the forming of gels and blockings in the spinnerettes and in the pumps. In this step it is therefore important to control the progressive increase in viscosity so as to be able to maintain the viscosity conditions which are most suitable for drawing.

SUMMARY OF THE INVENTION

The aim of the present invention is therefore to overcome the above described disadvantages with a process which allows to prepare ceramic fibers with a high $ZrO_2$ content without the occurrence of any precipitation of this compound in the starting solution for drawing.

An object of the invention is to provide a process which can be repeated in standard conditions with constant results.

Another object of the invention is to considerably shorten process times so as to make it suitable for industrial production.

A further object of the invention is to provide ceramic fibers which are perfectly stable even with rapid temperature variations and are suitable for withstanding temperatures up to 1500° C. and preferably 1200° C.

Not least object of the invention is to provide a process which can be performed with industrial-size drawing devices.

The Applicant has now surprisingly found, and this is a first aspect of the present invention, that it is possible to obtain the above described ceramic fibers with a process which comprises the steps of:

a) preparing a solution formed by the compound of formula (I)

$$Zr(OR^1)_4 \quad (I)$$

where $R^1$ is an alkyl or aryl,
by the compound of formula (II)

$$Si(OR^2)_4 \quad (II)$$

where $R^2$ is alkyl or aryl,
by an organic solvent and by an acid, preferably maintained at a temperature comprised between 0° and 100° C., and hydrolysis, with consequent polymerization of the compound of formula (I) and of the compound of formula (II), b) drawing of the solution obtained with said step (a), c) heating of the fibers obtained with said step (b) until the crystallization of $ZrO_2$ and $SiO_2$ is obtained, characterized in that said step (a) comprises the addition of vapor-phase water to said solution in the amount of 0.001 to 0.5 units by weight of water for each hour and for each unit by weight of said solution, until the viscosity suitable for drawing in the subsequent step (b) is achieved, the weight ratio between $SiO_2$ and $ZrO_2$ being comprised between 99 and 0.7.

The vapor-phase water is preferably added to the solution in the amount of 0.01 to 0.3 units by weight of water for each hour and for each unit by weight of the solution. More preferably, the water is added in the amount of 0.037 to 0.15 units by weight of water for each hour and for each unit by weight of solution.

The vapor-phase water is preferably diluted in a current of inert gas, for example nitrogen, and is then bubbled in the solution of said step (a).

According to another aspect of the present invention it is possible to obtain the above described ceramic fibers with a process which comprises the steps of:

a) preparing a solution formed by the compound of formula (I)

$$Zr(OR^1)_4 \qquad (I)$$

where R1 is an alkyl or aryl,
by the compound of formula (II)

$$Si(OR^2)_4 \qquad (II)$$

where R2 is an alkyl or aryl,
by an organic solvent and by an acid, preferably maintained at a temperature comprised between 0° and 100° C., and hydrolysis, with consequent polymerization of the compound of formula (I) and of the compound of formula (II), b) drawing of the solution obtained with said step (a), c) heating of the fibers obtained with said step (b) until the crystallization of $ZrO_2$ and $SiO_2$ is obtained, characterized in that said solution drawn in said step (b) is a solution with non-Newtonian viscous behavior, the weight ratio between $SiO_2$ and $ZrO_2$ being comprised between 99 and 0.7.

The viscous soltuion suitable for drawing perferably has a non-Newtonian viscous behavior at high and low viscosities. In particular, it has been observed that non-Newtonian solutions have good drawing characteristics.

More preferably, viscosity decreases significantly as the flow rate of the fluid increases during viscosity measurement.

The organic solvent is preferably a polar protophilic or aprotic solvent. The molar concentrations of the alkoxides in the organic solvent are comprised between 0.5M and 5M.

In particular, the molar concentrations of Zr(IV) are comprised between 0.5 and 3M. The molar concentrations of $Si(OR)_4$ are comprised between 1 and 5M.

The solvent is preferably chosen among one or more of the following: ethanol, methanol, butanol, tetrahydrofuran, acetone and dimethylformamide.

The choice of the solvent influences the shape and cross section of the drawn fibers. In particular, the choice of solvents with a low vapor pressure allows to obtain more cylindrical fibers.

The viscosity suitable for drawing in step (b) is preferably comprised between 0.2 and 100 Pas, preferably between 1 and 20 Pas. A viscosity of 0.2 Pas can be achieved in 0.5-3.5 minutes; a viscosity of 100 Pas can be achieved in 0.5-3 hours.

The viscosity suitable for drawing is preferably achieved with a total addition of such an amount of hydrolysis water as to reach a $H_2O$/total alkoxide molar ratio comprised between 1 and 10, preferably comprised between 1 and 4 and more preferably comprised between 1, 5 and 3.

According to a preferred embodiment of the process according to the invention, it is possible to achieve a greater control of the increase in viscosity during step (a) by adding a compound having the formula (III) in the solution:

$$Si(R^4)_2(OR^5)_2 \qquad III$$

where R4 and R5 are alkyls.

The compound of formula III is preferably added to the solution in a molar concentration of 10−3 to 10−2M. Higher concentrations do not lead to an increase in the effectiveness of viscosity control.

In order to obtain a greater stabilization of the solution, particularly when the compound of formula (I) is present in relatively large amounts, it is preferable to add a chelating agent to the solution of step (A) before adding vapor-phase water. Said chelating agent is a bifunctional compound, preferably a betadiketonic compound, constituted for example by acetylacetone.

Said chelating agent is preferably added in an amount comprised between 0.1 and 1.5 mols and more preferably between 0.3 and 0.8 mols and even more preferably between 0.5 and 0.7 mols for each mole of said compound of formula (I).

During the drawing step (b) it is possible to control the diameter of the fibers by controlling the cross section of the spinnerettes and the collecting speed. The spinnerettes preferably have a diameter comprised between 0.08 and 0.8 mm, more preferably comprised between 0.2 and 0.6 mm.

A follower tube heated to between 80° and 200° C. is preferably arranged below the spinnerette to facilitate the evaporation of the solvent.

The average values of the obtained fibers are comprised between 5 and 150 [micro]m.

In order to obtain fibers with cylindrical cross section it is furthermore preferable to perform the drawing step (b) in the absence of moisture, for example in an inert-gas atmosphere.

After drawing, the fibers are dried, for example at a temperature of 250° C., in order to totally eliminate the solvent. Drying times are preferably comprised between 1 and 5 hours.

It has been furthermore surprisingly found that if the fibers obtained with said step (b) are subjected to a water treatment in the liquid or vapor phase before they are subjected to step (c), the final product has a light color and is free from carbon residuals. This is particularly advantageous from an esthetical point of view and with regard to the mechanical properties of the final fibers. Water treatment is preferably performed at a temperature comprised between 60° and 250° C. and is particularly advantageous if it is preceded by a thermal stabilization treatment at a temperature comprised between 80° and 180° C. and preferably comprised between 130° and 170° C. Said thermal stabilization treatment preferably has a duration comprised between 100 and 1000 minutes.

The fibers thus obtained, after drawing and possibly after the thermal stabilization and water treatment are in gel form and in amorphous phase. In this form the fibers have a tensile strength of 200 to 800 MPas depending on their diameter. In particular, tensile strength increases as the diameter decreases.

The heating step (c) comprises a heating of the fibers up to a maximum temperature of 1500° C. and preferably of 1200° C. This heating is performed with a heating rate of for example 30° C. per minute. During this heating treatment, the fibers undergo crystallization which produces tetragonal-phase $ZrO_2$ crystallites enclosed by $SiO_2$ in amorphous phase for heating up to 1200° C. and $SiO_2$ crystallites in alphacristobalite phase for heatings above 1200° C. The tetragonal-phase $ZrO_2$ crystallites have an average size of less than 600A and preferably less than 400A. Average sizes of 300A are achieved.

In any case it has been observed that the tetragonal phase is kept stable even after 10 thermal cycles of heating up to 1200° C. and subsequent cooling to $-50°$ C. without the occurrence of phase change from tetragonal $ZrO_2$ to monoclinic $ZrO_2$. This is particularly important since it ensures the stability of the mechanical properties of the fibers.

Fiber heatings up to a temperature of 1500° obtain the crystallization of the $SiO_2$ into cristobalite with no appreciable modifications of the $ZrO_2$ phase.

This result is a direct consequence of hydrolysis control during step (a) of the process.

The ceramic fibers obtained at the end of step (b) can have a diameter comprised between 0.01 and 0.15 mm and at the end of step (c) they can have a diameter comprised between 0.005 and 0.1 mm.

BRIEF DESCRIPTION OF THE DRAWINGS

Further characteristics and advantages of the invention will become apparent from the description of five examples, illustrated hereafter only by way of non-limitative example with reference to the accompanying drawings, wherein.

DETAILED DESCRIPTION OF THE PREFERRED EMBODIMENTS

Example 1

The preparation of silica-zirconia fibers resistant at high temperature, particularly useful for thermal insulation, consists of three steps: densification of metal alkoxides in solution by hydrolysis, drawing and stabilization of fibers and conversion of the drawn fibers into the product by heating.

Figure 13:
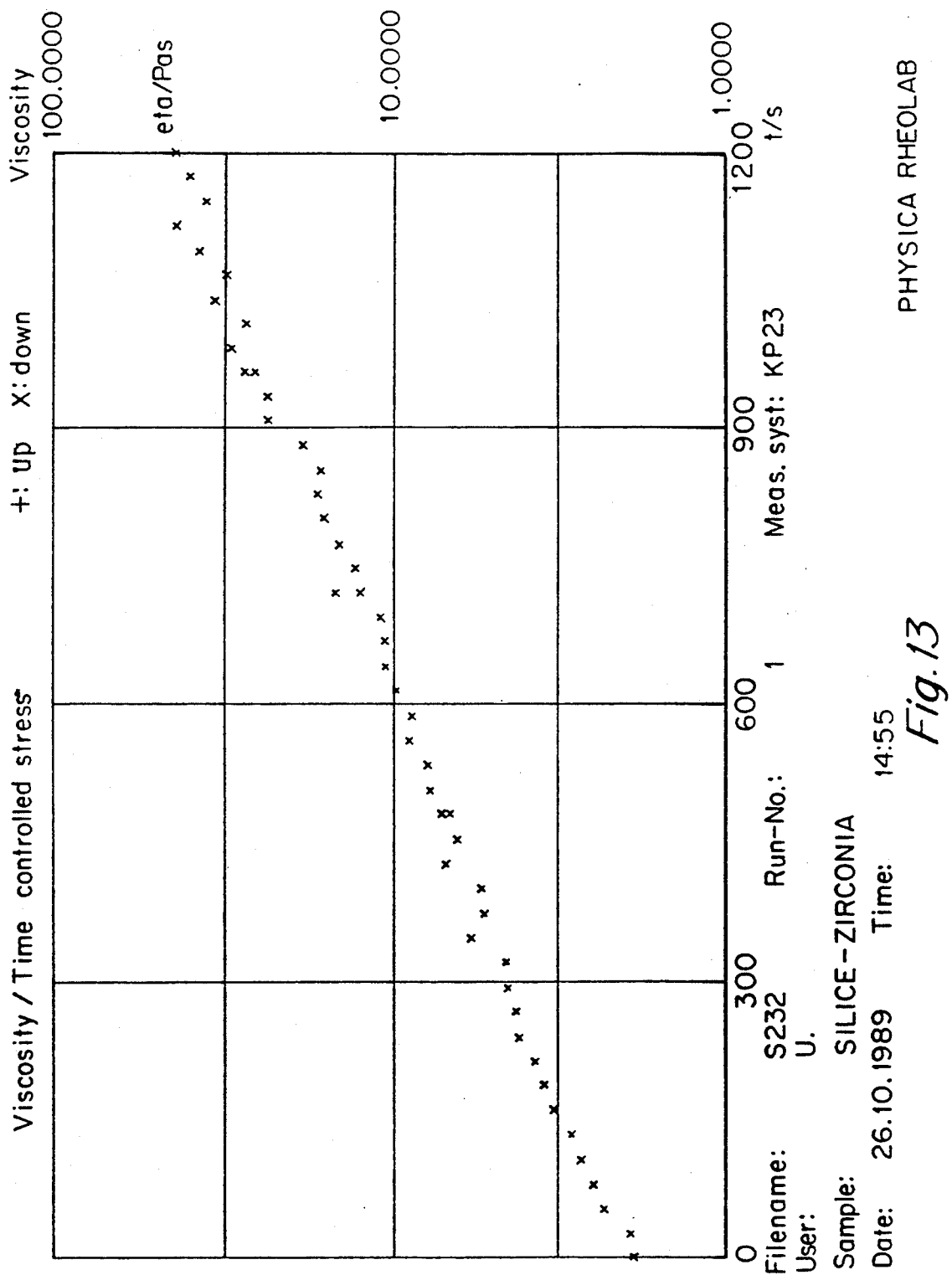
FIG. 13 is an enlarged-scale diagram of viscosity as a function of time for solutions according to step (a) of the present invention.

A solution of this composition was prepared:
58.2 gr $Si(OEt)_4$
19.6 gr $Zr(OPr)_4$
29.1 gr absolute ethanol
2 ml fuming nitric acid The homogeneous solution, prepared at room temperature, was stirred and refluxed at 80° C. for 3 hours. The solution was then transferred into a 100 ml flask where, under stirring, vapor was bubbled by a pipe connected to a vessel containing $H_2O$ at 85° C. The steam was transported by a nitrogen flow (150 ml/min) for 8 hours so that 3.65 ml of $H_2O$ were introduced in the solution. At that time the viscosity of the solution was 1 Pas and it was possible to draw fibers. FIG. 13 shows the viscosity of the solution as a function of time.

Fibers were obtained by extrusion through a spinnerette having holes of 0.3 mm, the applied pressure was 2.5 atm. Nozzles with lower diameters were rapidly blocked up.

Continuous fibers could be extruded and then rolled up. The fibers on the roll were hydrolyzed in an autoclave at 120° C. 6 hours with steam.

Figure 3:
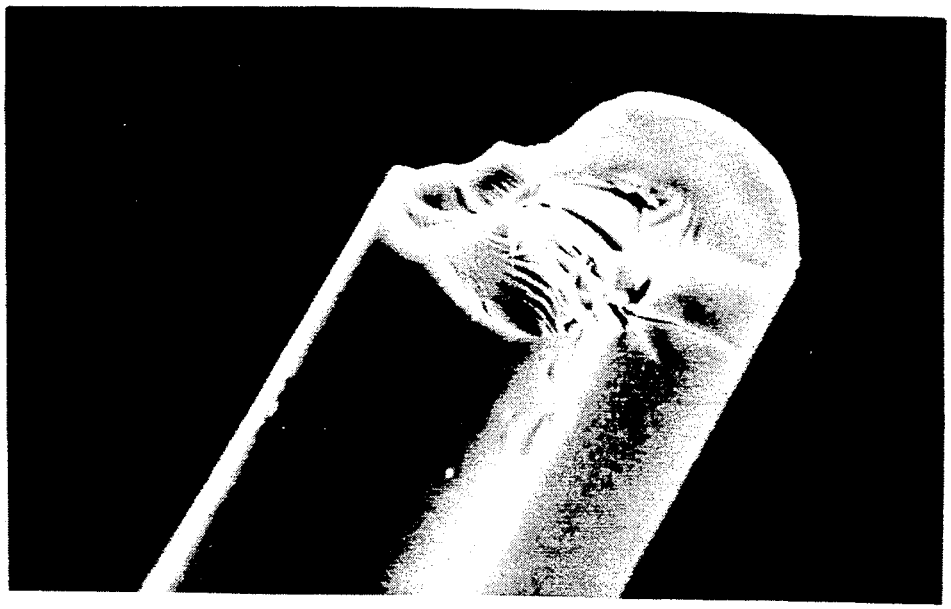
FIG. 3 is a photomicrograph of ceramic fibers according to the invention with no thermal treatment.

The fibers were dried at 200° C. for 2 hours, then heated to 600° C. for additional two hours assuming total elimination of solvent and residual organic groups. Fibers so obtained are shown in the photomicrograph of FIG. 3.

Figure 6:
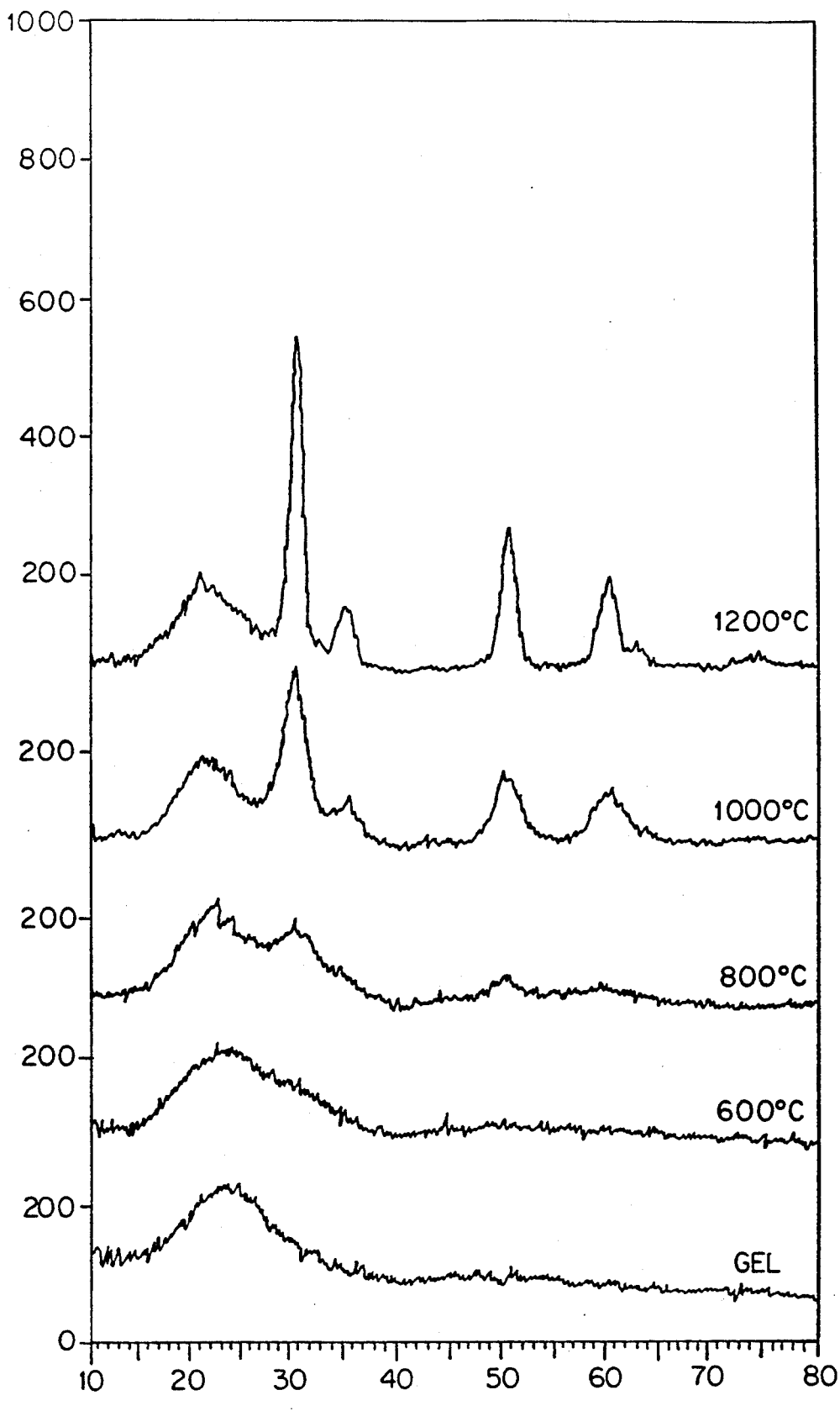
FIG. 6 is a diagram illustrating the crystallinity peaks of fibers according to the invention.

The fibers were heated from 600° C. to 1200° C. with a heating rate of 50° C./min, maintained at this temperature for 15 min and then quenched in air at room temperature. These experimental conditions were sufficient for causing the crystallization of the zirconia in the tetragonal phase while silica remained amorphous as shown in FIGS. 1 and 6 and previously described.

Figure 1:
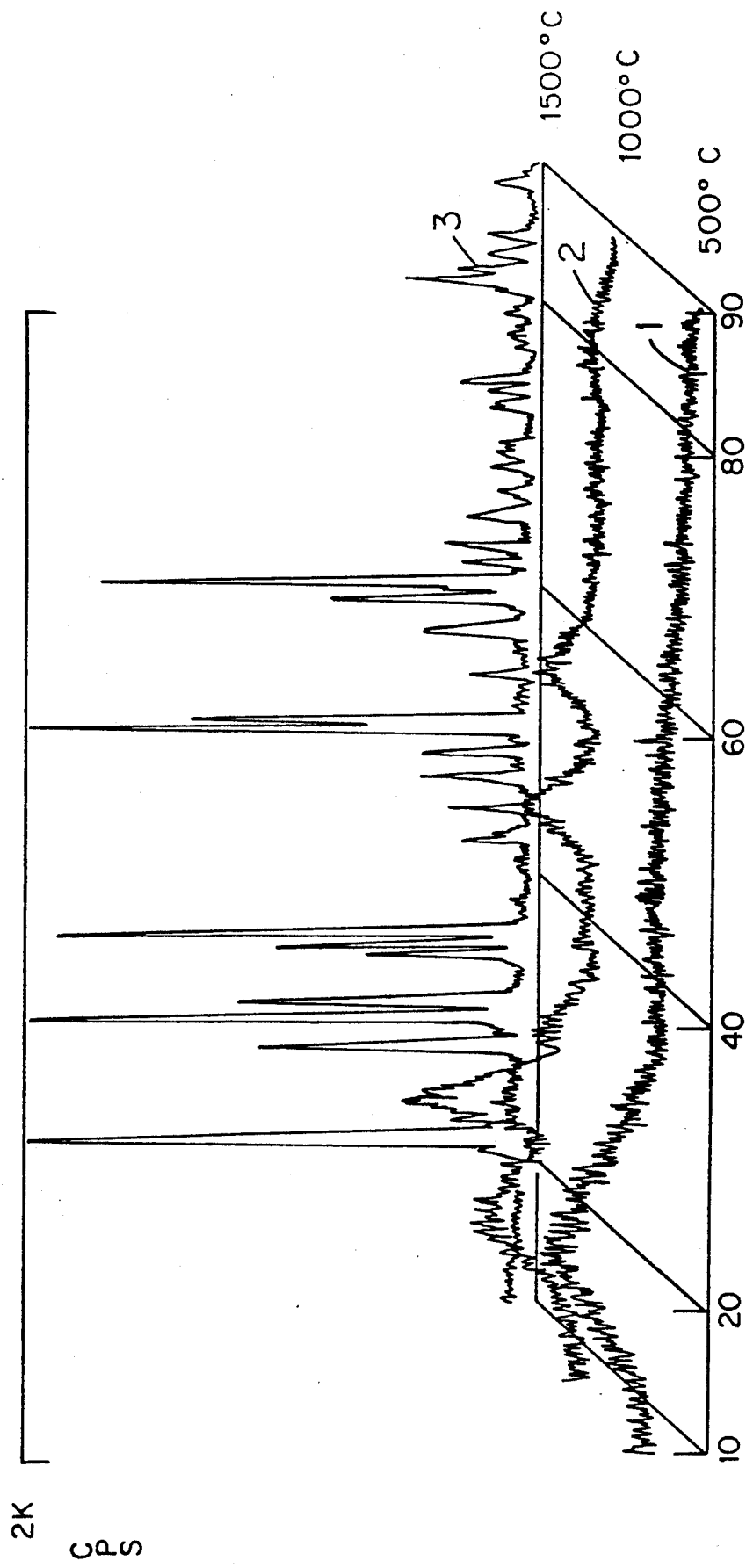
FIG. 1 is a diagram of the phase transition of the fibers according to the invention.

FIG. 1 illustrates the behavior of the crystallization due to this heating, as indicated by the X-ray diffraction spectrum. In particular, curve 1 indicates that the separation of $ZrO_2$ in tetragonal form begins at the temperature of 500° C. and continues up to 900° C.

In particular, the diagram passes from the temperature of 500° C., at which practically only the amorphous phase is present, to curve 2 at 1000° C., in which the separation of tetragonal $ZrO_2$ crystallites occurs. Curve 3, which corresponds to the attainment of the temperature of 1500° C., shows tetragonal $ZrO_2$ and alphacristobalite $SiO_2$.

During heating the fibers undergo a diameter reduction of approximately 40%.

Figure 4:
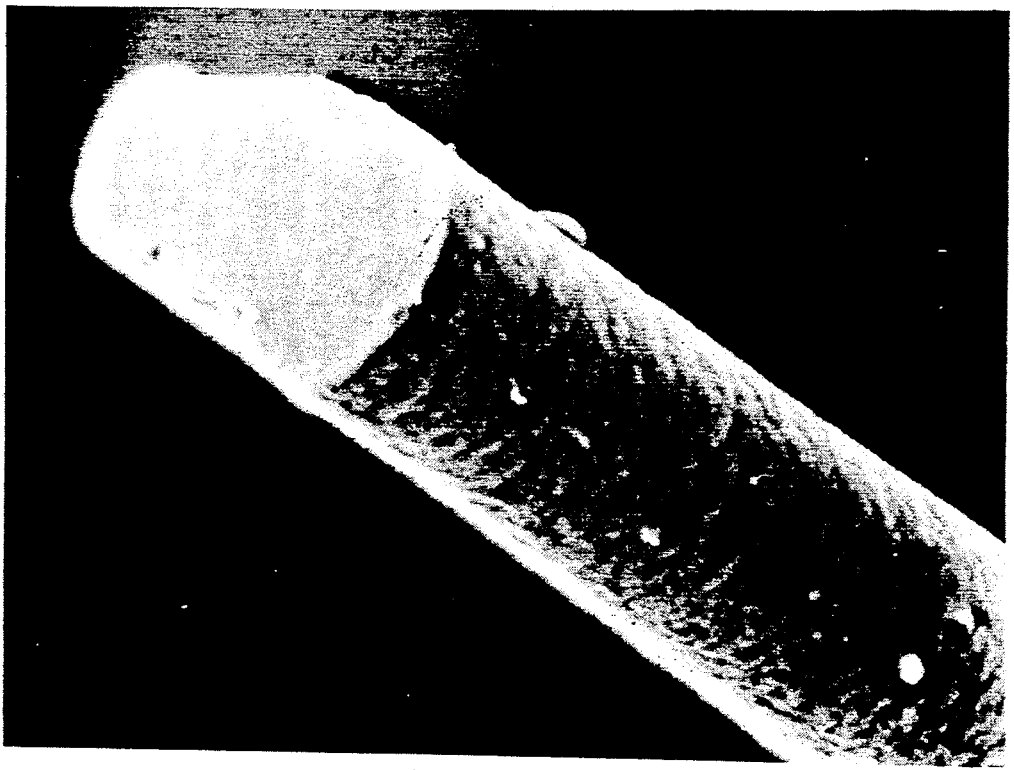
FIG. 4 is a photomicrograph of ceramic fibers according to the invention with thermal treatment at 1500° C.
Figure 5:
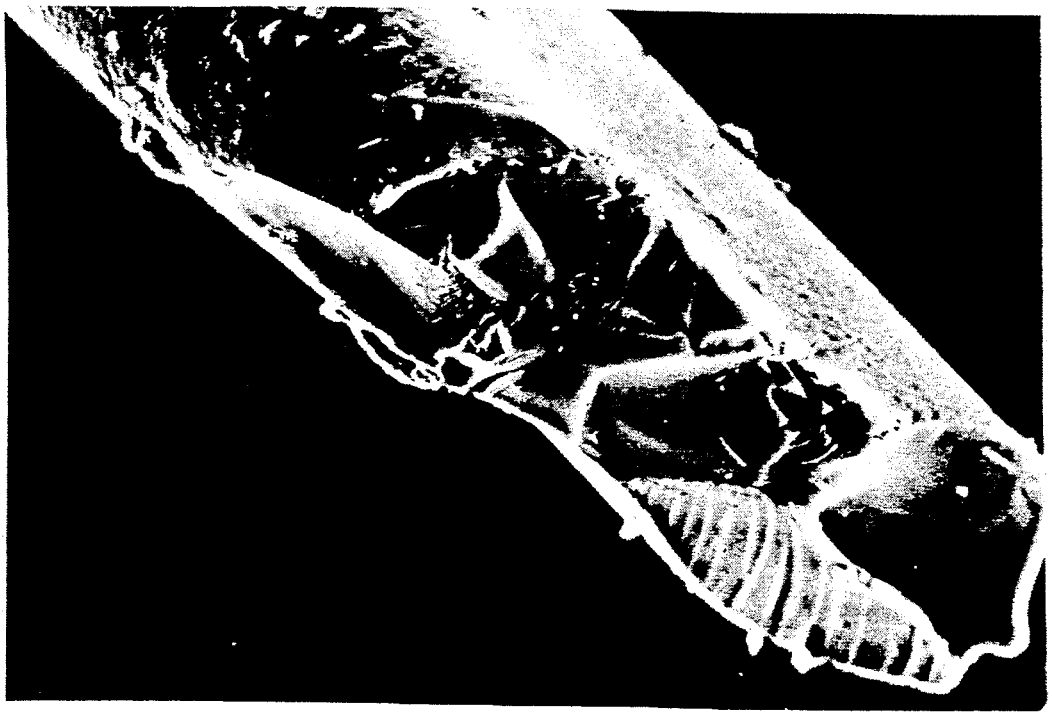
FIG. 5 is a photomicrograph of ceramic fibers according to the invention with thermal treatment at 1200° C.
Figure 10:
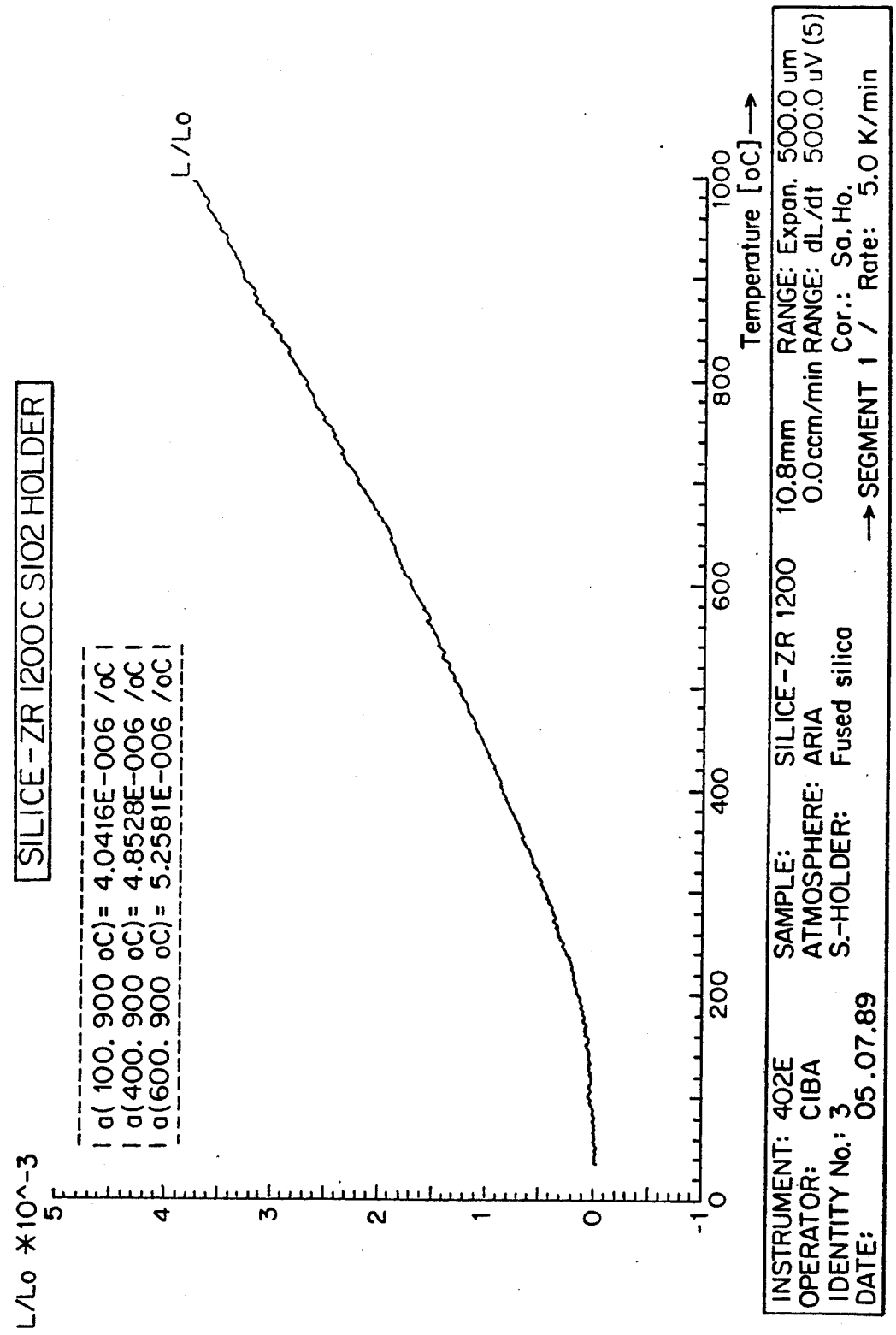
FIG. 10 is an elongation/temperature diagram of the fibers according to the invention.
Figure 11:
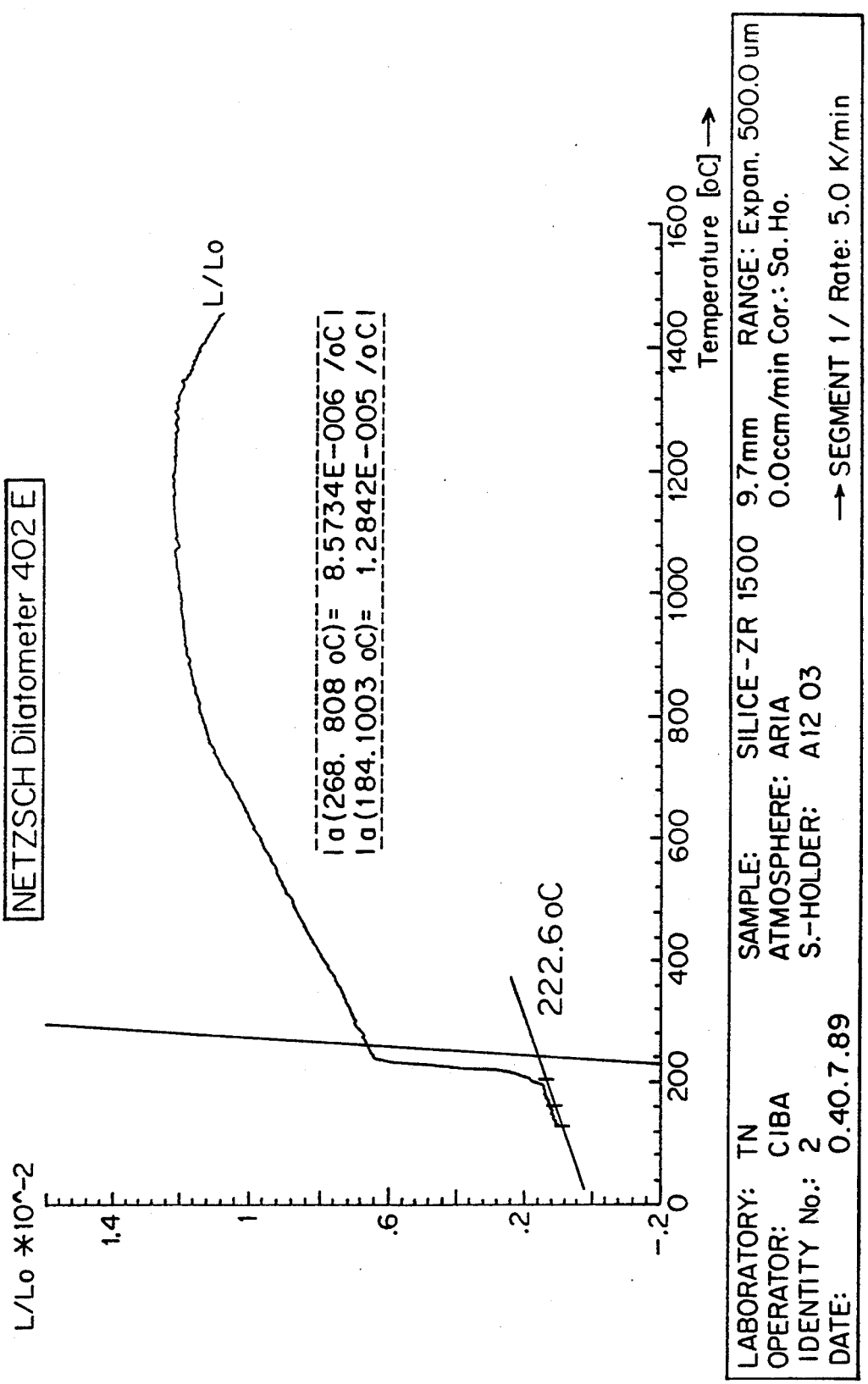
FIG. 11 is an elongation/temperature diagram of the fibers according to the invention.

The final material shows a compact structure as shown in the fracture surface micrograph of FIG. 5 (product at 1200° C.) and FIG. 4 (product at 1500° C.), without pores or defects. The density of fibers obtained at 1200° C. is=2.81 g/cu.cm (theoretical density for $ZrO_2$ 20%—$SiO_2$ 80%=2.98 g/cu.cm). The thermal expansion coefficient for materials sinterized from fibers previously heated at 1200° C. is $4 \times 10-6$°C.$-1$ in the temperature interval 100°-900° C. (FIG. 10); FIG. 11 shows the thermal expansion for fibers previously heated at 1500° C. Table 1 shows the evolution of surface area for samples heated at different temperatures.

TABLE 1

| Temperature °C. | Specific surface area $m^2$/G (BET/$N_2$) |
|---|---|
| 200 | 18.229 |
| 800 | 6.992 |
| 1200 | 5.011 |

Mechanical properties were calculated for fibers heated at different temperatures and for various times. The material shows a strength depending on fiber diameter and heating procedures according to the trends of FIGS. 7, 8 and 9.

Figure 7:
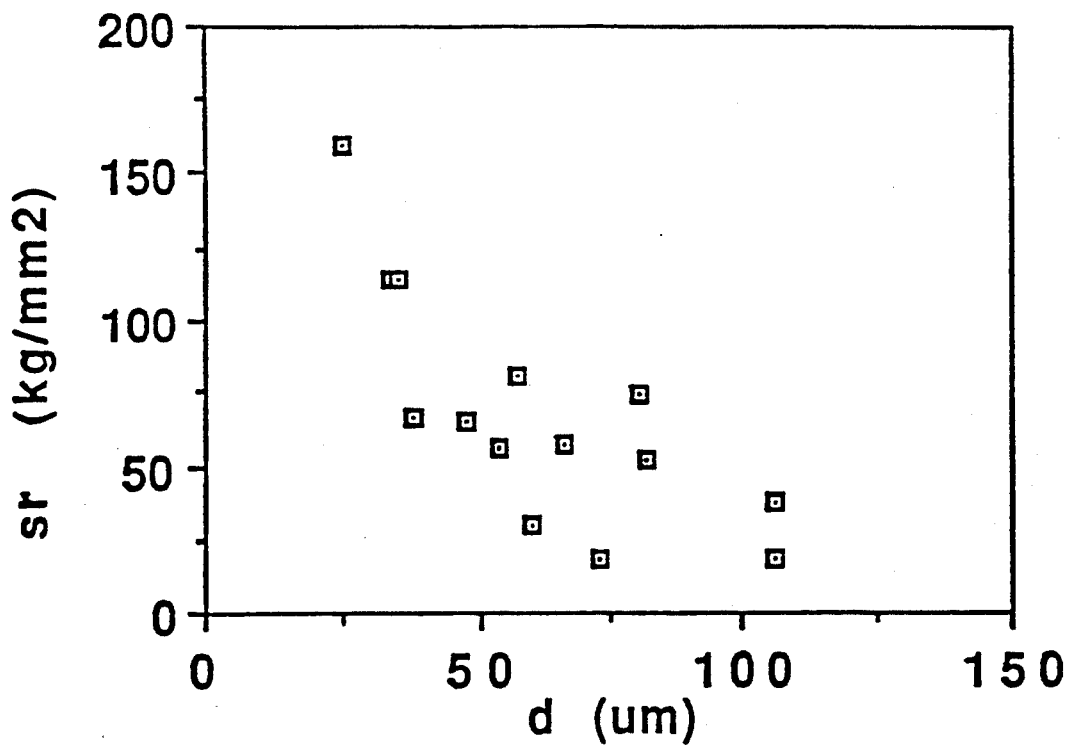
FIG. 7 illustrates the mechanical properties of the fibers with thermal treatment at 1200° C. according to the invention.
Figure 8:
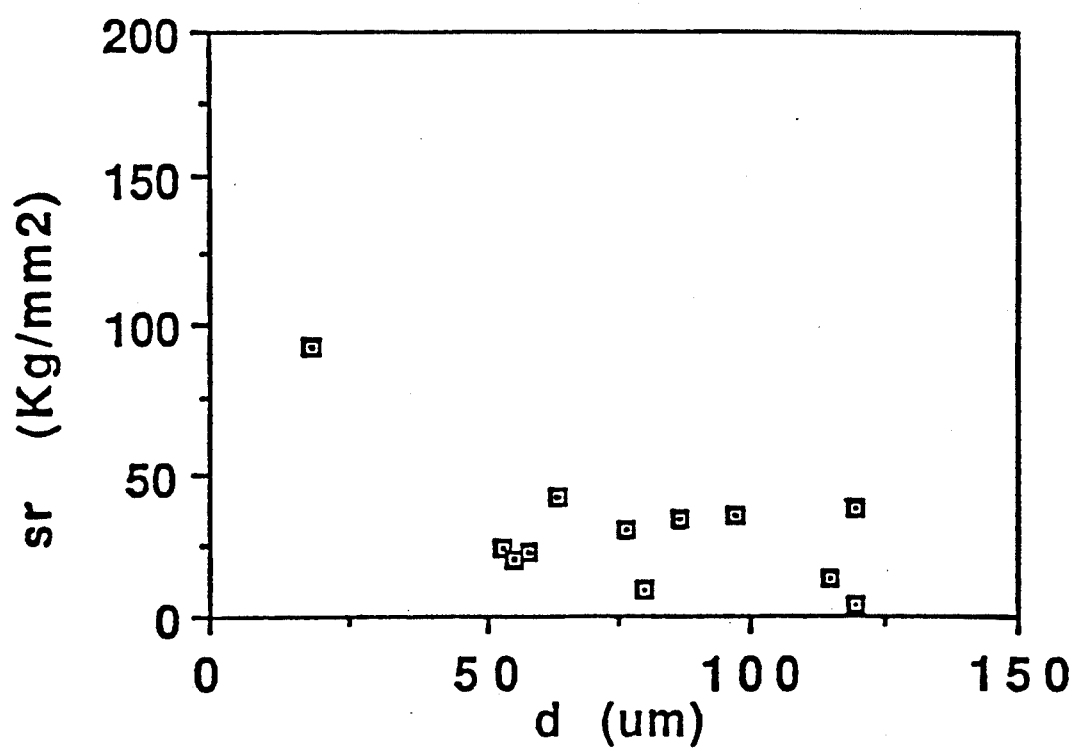
FIG. 8 illustrates the mechanical properties of the fibers in the absence of thermal treatment.
Figure 9:
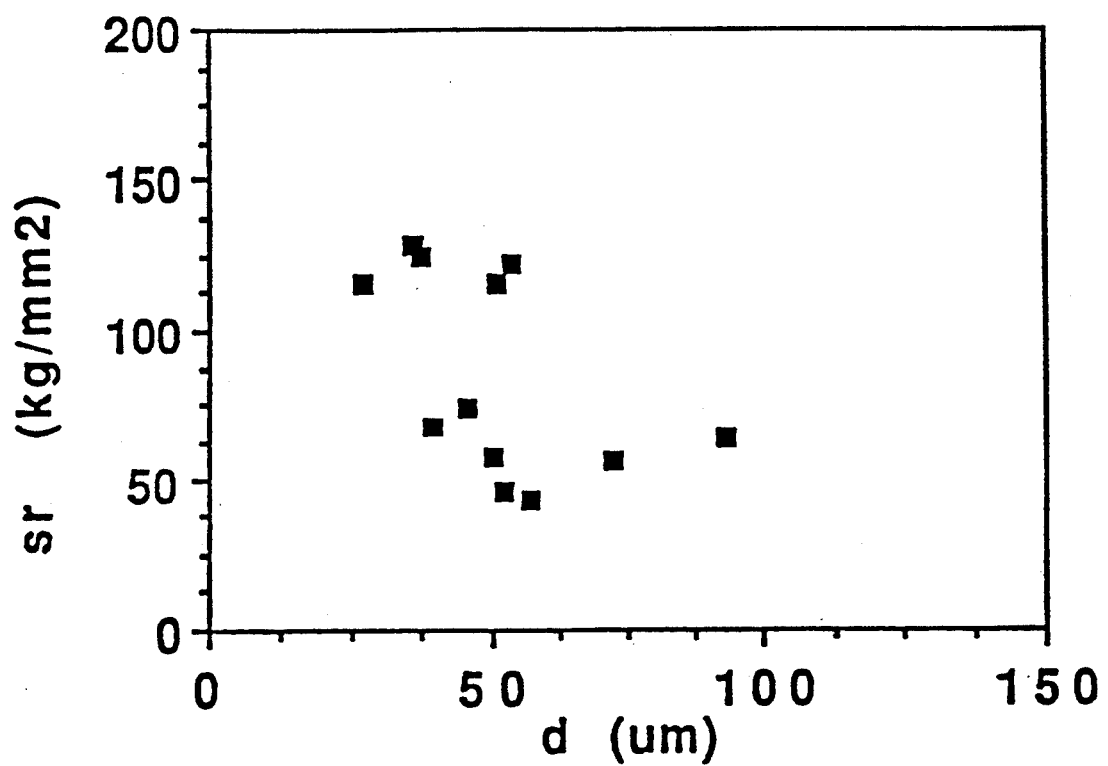
FIG. 9 illustrates the mechanical properties of the fibers with thermal treatment at 900° C.

In particular, FIG. 7 relates to fibers subjected to heating at 1200° C. for 15 minutes. FIG. 8 relates to fiber which has only been hydrolysed. FIG. 9 relates to fibers subjected to heating at 900° C. for 30 minutes.

Example 2

The following were mixed at room temperature in a 250-ml flask:
29.1 gr of Si(OEt)$_4$
9.8 gr of Zr(OPr)$_4$
13.4 gr of butyl alcohol
1 ml of concentrated nitric acid The solution was then capted under reflux and stirring for 2 hours.

Figure 12:
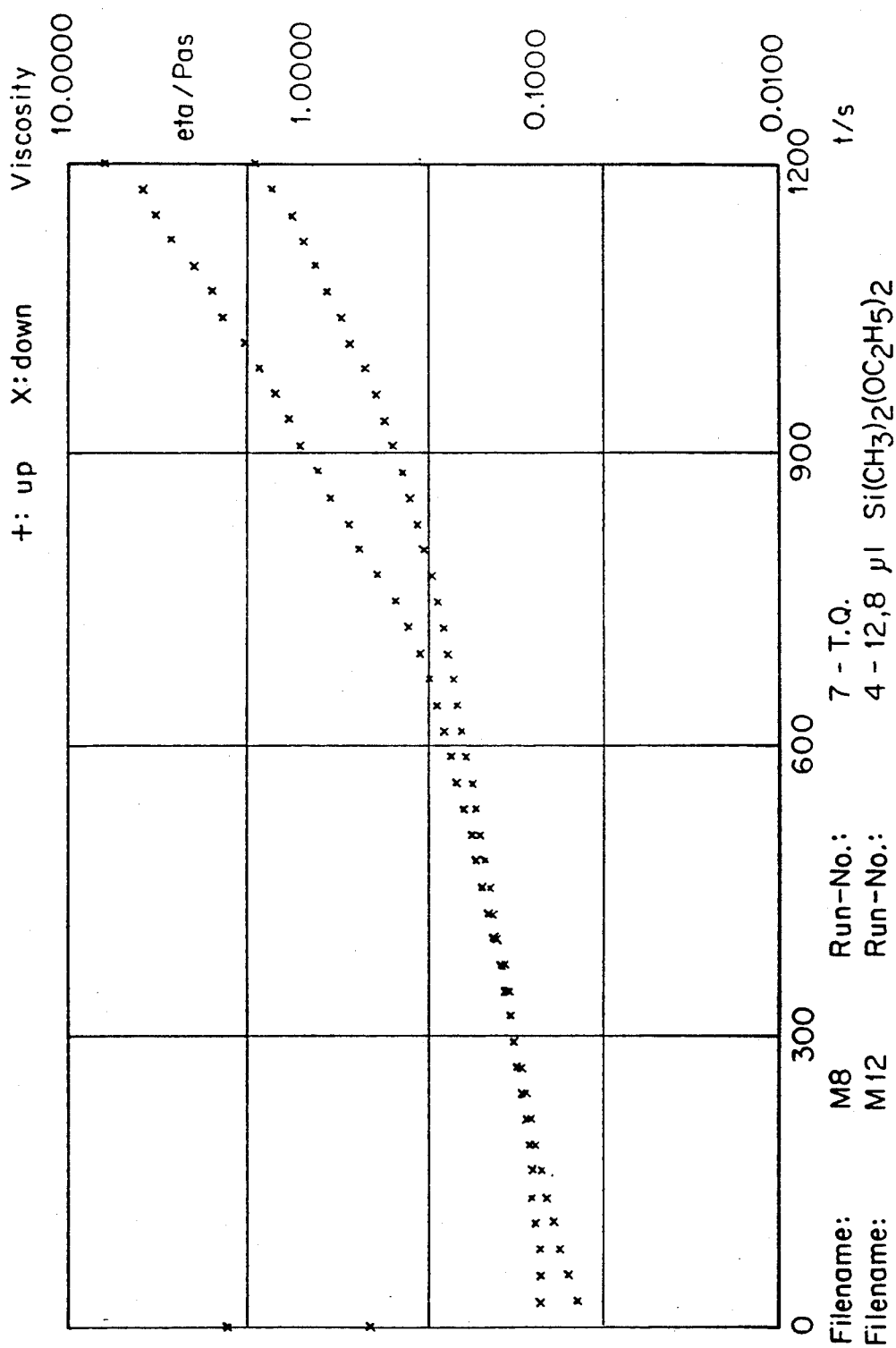
FIG. 12 is a diagram of viscosity as a function of time for solutions according to step a) of the present invention.

After cooling the solution to room temperature, the water required for the reaction was then added, as already indicated in Example 1, for a total amount of 2 ml. At the end of the vapor treatment, 12.8 [micro]l of DMDES [dimethyldietoxysilane (Si(Me)$_2$(OEt)$_2$)] were added: the viscosity increase of this solution in the course of time is plotted in FIG. 12, where the similar curve without the additive is also provided for the sake of comparison.

DMDES in catalytic amounts therefore allows a better rheological control of the solution.

The fibers prepared from this viscous sol as already indicated in Example 1, show the same mechanical and morphological properties as those prepared from the sol without additives.

Example 3

A solution with the following composition was prepared:
14.55 gr of Si(OEt)$_4$
4.8 gr of Zr(OPr)$_4$
6.7 gr of n-butyl alcohol
0.5 gr of concentrated nitric acid After being allowed to reflux for 3 hours, the solution was caused to react with water vapor according to the methods already indicated in Example 1 (total added water: 0.9 ml).

Figure 2:
FIG. 2 is a photomicrograph of ceramic fibers according to the invention with no thermal treatment.
Figure 14:
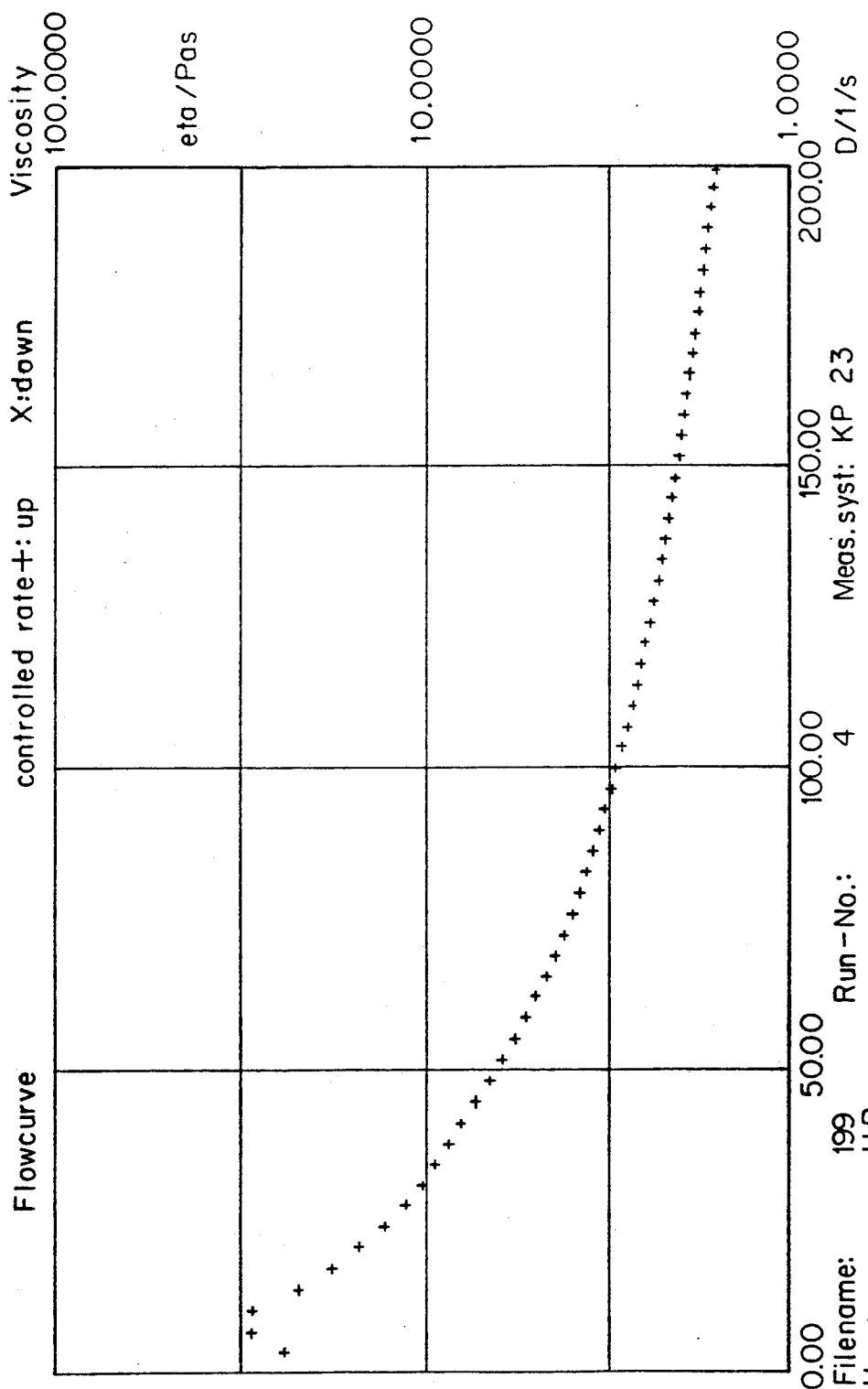
FIG. 14 is an enlarged-scale diagram of viscosity as a function of flow rate for solutions according to step (a) of the present invention.

At this point viscosity was 1.5 Pas. FIG. 14 shows the behavior of viscosity as a function of the solution's flow rate. As the flow rate increases, viscosity decreases by over 10 times. This solution was then extruded in a controlled-atmosphere chamber under nitrogen so that the fibers could be gathered in the absence of moisture. FIG. 2 illustrates the cylindrical geometry of the gel fibers thus obtained.

After the thermal treatments of Example 1, the obtained fibers of the product have mechanical properties which are similar to those of Example 1.

Example 4

(for comparison)

This example relates to the molar composition of silica/zirconia equal to 29.1/70.9 to show that the crystalline phase is different from the tetragonal phase at the higher zirconia percentages.

A solution with the following composition was prepared:
2.3 gr of Si(OEt)$_4$
8.8 gr of Zr(OPr)$_4$
6 ml of absolute ethyl alcohol
6.4 [micro]l of concentrated hydrochloric acid
1.6 ml of acetylacetone.

The solution was placed in a nitrogen and water vapor current as in Example 1.

The gel fibers thus obtained were then hydrolyzed in an autoclave with steam at 120° C. for 6 hours.

Said fibers were then dried at 200° C. for 2 hours, then heated at 600° C. for another 2 hours and finally treated up to 1200° C. with a heating rate of 40° C./min. The material resulting from these treatments was composed of monoclinic $ZrO_2$ in crystals with an average diameter of 450A, of $ZrSiO_4$ in separate phase and of amorphous silica.

The final product cannot be used for measurements related to its mechanical characteristics, since it is extremely fragile even for fibers with a diameter of less than 25 [micro]m.

Example 5

This example relates to a silica/zirconia molar composition of 50/50.

A solution with the following composition was prepared:
11.2 gr of Si(OEt)$_4$
8.8 gr of Zr(OEt)$_4$
6 ml of dimethylformamide
6.4 [micro]l of hydrochloric acid
1.6 ml of acetylacetone This solution was placed under the action of a nitrogen/water vapor current for 3 hours (total amount of water added: 2.5 ml) in the manner already indicated in Example 1.

At the end of the addition of the water required for the reaction, the sol had an initial viscosity of 2 Pas.

12.8 [micro]l of Si(Me)$_2$(OEt)$_2$ were added to this sol: the resulting sol remains within the viscosity range suitable for drawing for 45 minutes.

At the end of the drawing process, the resulting gel fibers undergo the same thermal processes in the manner already illustrated in the preceding examples.

We claim:

1. Process for preparing $ZrO_2$- and $SiO_2$-based ceramic fibers, comprising the steps of:
   a) preparing a homogeneous solution formed by the combination of:

$$Zr(OR^1)_4 \quad (I),$$

where $R^1$ is an alkyl or aryl;

$$Si(OR^2)_4 \quad (II),$$

where $R^2$ is an alkyl or aryl, the starting weight ratio of $SiO_2$ and $ZrO_2$ ranging from about 99 to about 0.7;
   an organic solvent; and an acid,
   b) hydrolysing the solution of step a) at a temperature between about 0° C. and about 100° C., sufficient to polymerize the compounds of formulas (I) and (II);
   c) drawing the solution obtained in said step b) into fibers,
   d) heating the fibers obtained in said step c) until the crystallization of tetragonal $ZrO_2$ and a separate $SiO_2$ phase is obtained to produce a fiber made of crystallite $ZrO_2$ enclosed in $SiO_2$,
   wherein step b) includes the addition of steam to said solution, in the amount of 0.001 to 0.5 units by weight of water per unit weight of said solution, per hour of hydrolysis until a viscosity suitable for drawing is reached.

2. Process according to claim 1, wherein said steam is added in the amount of 0.01 to 0.3 units by weight of water for each hour of hydrolysis and for each unit by weight of said solution.

3. Process according to claim 1, wherein said steam is added in the amount of 0.037 to 0.15 units by weight of water for each hour and for each unit by weight of said solution.

4. Process according to claim 1, wherein said steam is diluted in a current of inert gas.

5. Process according to claim 4, wherein said steam diluted in said inert-gas current is bubbled in said solution of said step (a).

6. Process according to claim 1, further comprising the addition of a chelating agent to said solution of said step (a) before the addition of steam.

7. Process according to claim 6, wherein said chelating agent is a bifunctional and betadiketone organic compound.

8. Process according to claim 7, wherein said chelating agent is added in an amount between 0.1 and 1.5 mols for each mole of said compound of formula (I).

9. Process for preparing $ZrO_2$- and $SiO_2$-based ceramic fibers, comprising the steps of:
   a) preparing a homogeneous solution formed by the combination of:

$$Zr(OR^1)_4 \quad (I),$$

where $R^1$ is an alkyl or aryl;

$$Si(OR^2)_4 \quad (II),$$

where $R^2$ is an alkyl or aryl, the starting weight ratio of $SiO_2$ and $ZiO_2$ ranging from about 99 to about 0.7;
   an organic solvent; and an acid,
   b) hydrolysing the solution of step a) at a temperature between about 0° C. and about 100° C., sufficient to polymerize the compounds of formulas (I) and (II);
   c) drawing the solution obtained in said step b) into fibers,
   d) heating the fibers obtained in said step c) until the crystallization of tetragonal $ZrO_2$ and a separate $SiO_2$ phase is obtained to produce a fiber made of crystallite $ZrO_2$ enclosed in $SiO_2$,
   wherein said solution drawn in said step c) is a solution with non-Newtonian viscous behavior in which viscosity changes with flow rate.

10. Process according to claim 9, wherein the viscosity of said solution significantly decreases as the fluid flow rate increases during viscosity measurement.

11. Process according to claim 9, wherein the viscosity change in said step (a) is controlled by adding a $$Si(R^4)_2(OR^5)_2 \quad \text{III to the solution}$$

where $R^4$ and $R^5$ are alkyls.

12. Process according to claim 11, wherein said compound with formula III is added to the solution in a molar concentration of $10-3$ to $10-2$M.

13. Process according to claim 9, wherein the fibers obtained in said step (c) are subjected to a water treatment in liquid or vapor phase before being subjected to said step (d).

14. Process according to claim 13, wherein said water treatment is preceded by a thermal stabilization treatment at a temperature between about 80° and about 180° C.

15. Process according to claim 1, characterized in that said heating step (c) comprises a heating of about the fibers up to a maximum temperature of 1200° C.

16. Process according to claim 1, wherein said viscosity suitable for drawing is between about 0.2 and 100 Pas.

17. A process for preparing zirconia and silica-based ceramic fibers comprising the steps of:
   a) preparing a homogeneous metal alkoxide solution having a plurality of metal alkoxide components;
   b) hydrolyzing the metal alkoxides with water vapor under conditions sufficient to cause polymerization of said metal alkoxides without precipitation of said metal alkoxides;
   c) drawing the resulting polymerized metal alkoxides into fibers;
   d) treating said fibers attained in step (c) with water vapor at a temperature between about 60° C. and about 250° C.;
   e) heating said fibers up to a maximum temperature of between about 1200° C. and about 1500° C., the resulting ceramic fibers being free from residual carbon.

18. The process according to claim 17, further comprising heating said fibers prior to water vapor treatment at a temperature between about 80° C. and about 180° C. for between about 100 and about 1000 minutes.

19. In a method of preparing zirconia and silica-based ceramic fibers, comprising the steps of:
   preparing a metal alkoxide solution;
   providing water to the metal alkoxide solution to cause hydrolysis and polymerization of said metal alkoxide solution;
   drawing polymerized metal alkoxides into fibers; and heating said fibers to form a zirconia and silica-based ceramic, wherein the improvement comprises:

providing a metal alkoxide solution that exhibits non-Newtonian behavior and regulating the viscosity of the solution by providing water to the solution in a water/total alkoxide molar ratio between about 1 and about 10 so that polymerized metal alkoxide fibers can be drawn from said metal alkoxide solution.

20. The process according to claim 7, wherein the chelating agent is added in an amount between about 0.3 and about 0.8 mols per mole of said compound of formula (I).

21. The process according to claim 7, wherein the chelating agent is added in an amount between about 0.5 and about 0.7 mols per mole of said compound of formula (I).

22. The process according to claim 13, wherein said water treatment is preceded by a thermal stabilization treatment at a temperature between about 130° C. and about 170° C.

23. The process according to claim 1, wherein said viscosity suitable for drawing is between about 1 and about 20 Pas.

24. The process according to claims 1, 9 or 17 wherein the fibers are drawn in the absence of moisture.

25. The process of claim 24, wherein the fibers are drawn in an inert-gas atmosphere.

26. A process for regulating the viscosity of a metal alkoxide solution during production of metal-based ceramic fibers, comprising hydrolysing said metal alkoxide solution with a total addition of water so as to reach a water/total alkoxide molar ratio between about 1 to about 10.

27. The process according to claim 26, wherein the water/total alkoxide molar ratio is between about 1 to about 4.

28. The process according to claim 27, wherein the water/total alkoxide molar ratio is between about 1.5 to about 3.

29. The process according to claims 26 or 28, wherein the metal alkoxide solution exhibits non-Newtonian behavior.

* * * * *